United States Patent [19]
Gannon

[11] Patent Number: 5,796,086
[45] Date of Patent: Aug. 18, 1998

[54] READ HEAD BRACKET FOR MAGNETIC READER

[75] Inventor: Colleen Gannon, Jordan, N.Y.

[73] Assignee: Welch Allyn, Inc., Skaneateles Falls, N.Y.

[21] Appl. No.: 599,706

[22] Filed: Feb. 12, 1996

[51] Int. Cl.$^6$ .................................................. G06K 7/08
[52] U.S. Cl. ........................................ 235/449; 382/139
[58] Field of Search ............................... 235/449, 482; 382/139

[56] References Cited

U.S. PATENT DOCUMENTS 5,479,532  12/1995  Abel et al. .................. 235/449 X

*Primary Examiner*—F. L. Evans
*Attorney, Agent, or Firm*—Wall Marjama & Bilinski

[57] ABSTRACT

A magnetic reader having a rotatable roller that forms a nip with a magnetic read head through which an article bearing magnetizable characters is driven along a predetermined path of travel. The read head is mounted in a bracket in which a magnet is also supported. The bracket is pivotally supported in the reader housing and is biased to urge the read head against the drive roller under a predetermined load and position the magnet adjacent to the path of travel.

11 Claims, 5 Drawing Sheets

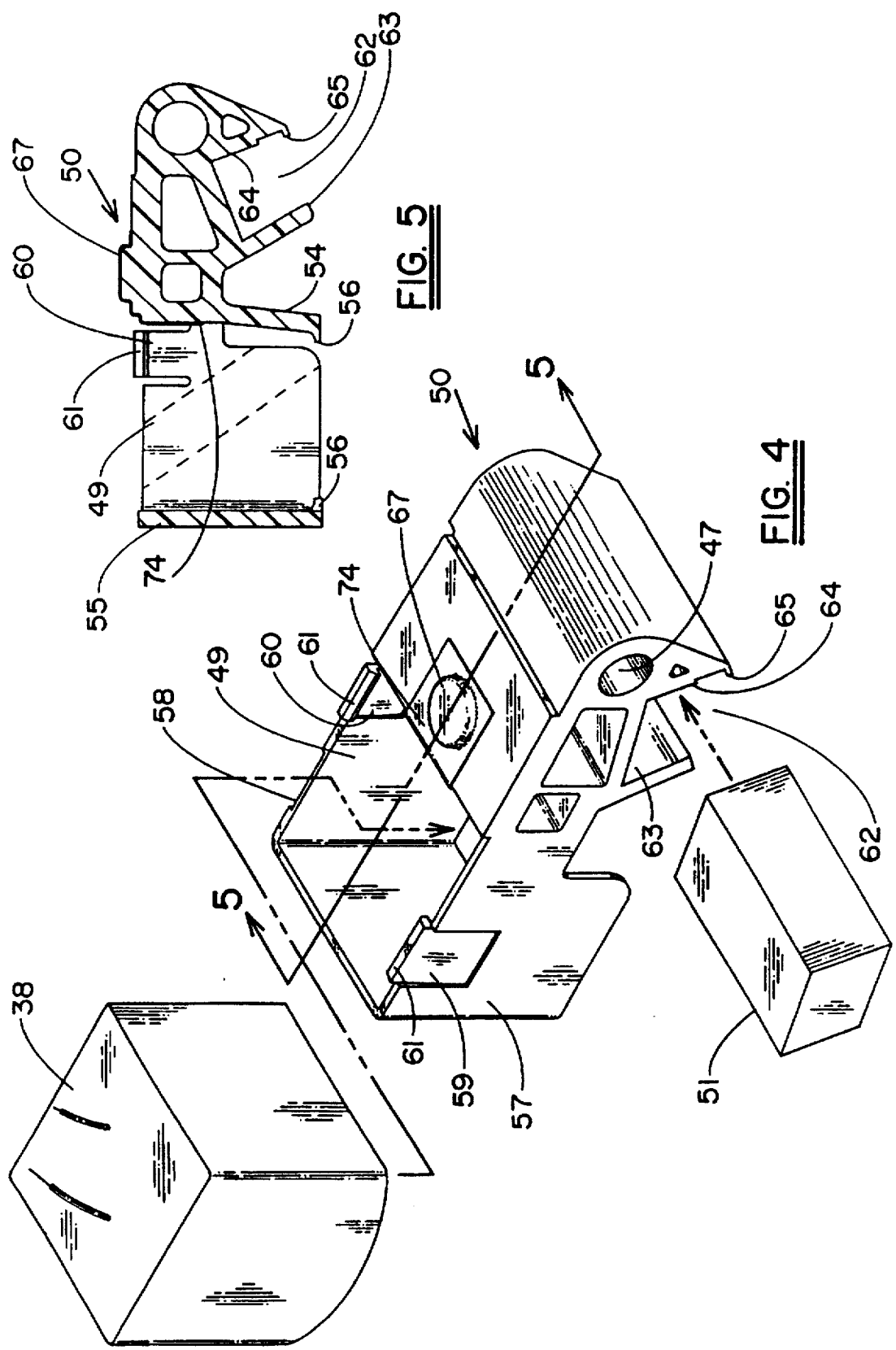

1

READ HEAD BRACKET FOR MAGNETIC READER

BACKGROUND OF THE INVENTION

This invention relates to a magnetic reader and more specifically, to a bracket for supporting a magnetic and a read head in a reader housing.

Typically in magnetic readers the article carrying magnetizable information (characters) is first passed beneath a properly polarized and aligned magnet to produce a latent magnetic image of the characters each of which has a separate easily identifiable signature. The magnetized characters are then passed under a read head whereby the latent image is read. The read out data is then passed to a remote location in the form of an electrical output signal.

Many magnetic readers mount the magnet and the read head in separate holders. It has been found, however, that the separately mounted components can vibrate at different frequencies setting up noise signals that interact in an additive manner to produce high amplitude noise that, under certain conditions, adversely effects the character read out signals. They are generally made of metal and as a consequence, the read head must be glued in place which requires a good deal of manufacturing time and is subject to significant mounting and aligning errors.

Mounting of the necessary magnet or magnets has also proven to be difficult in prior art devices because of space requirements. The magnet or magnets must oftentimes be remotely located with regard to the path of travel of the article making effective magnetizing of the characters difficult.

SUMMARY OF THE INVENTION

It is therefore an object of the present invention to improve apparatus for reading magnetic images carried on an article.

It is a further object of the present invention to reduce the amount of unwanted noise produced by a magnetic reader.

It is a still further object of the present invention to mount both the magnet and the read head of a magnetic reader within a single bracket.

Another object of the present invention is to more efficiently process an article bearing magnetizable characters through a magnetic reader.

Yet another object of the present invention is to mount the magnet and the read head of a magnetic reader compactly in close proximity along the path of travel followed by an article being processed by the reader.

These and other objects of the present invention are attained by a magnetic reader that includes a housing in which a drive roller is rotatably mounted for engaging an article bearing magnetizable characters and advancing the article along a prescribed path of travel. The drive roller is coupled to a motor by means of a gear train. A molded plastic bracket is pivotally supported in the housing adjacent the path of travel. A magnetic read head is mounted in the housing in juxtaposition with the drive roller and a magnet is similarly mounted in the bracket upstream from the read head with regard to the path of travel. A biasing means is mounted in the housing and acts upon the bracket to urge the read head into contact with the drive roll whereby an article passed into the nip formed between the drive roll and the read head is driven along the path of travel beneath the magnet and the read head.

BRIEF DESCRIPTION OF THE DRAWINGS

For a better understanding of these and other objects of the present invention, reference shall be made to the following detailed description of the invention which is to be read in association with the accompanying drawings, wherein:

FIG. 4 is a further enlarged perspective view illustrating the mounting bracket shown in FIG. 3;

FIG. 5 is a sectional view taken along line 5—5 in FIG. 4; and

DESCRIPTION OF THE INVENTION

Figure 1:
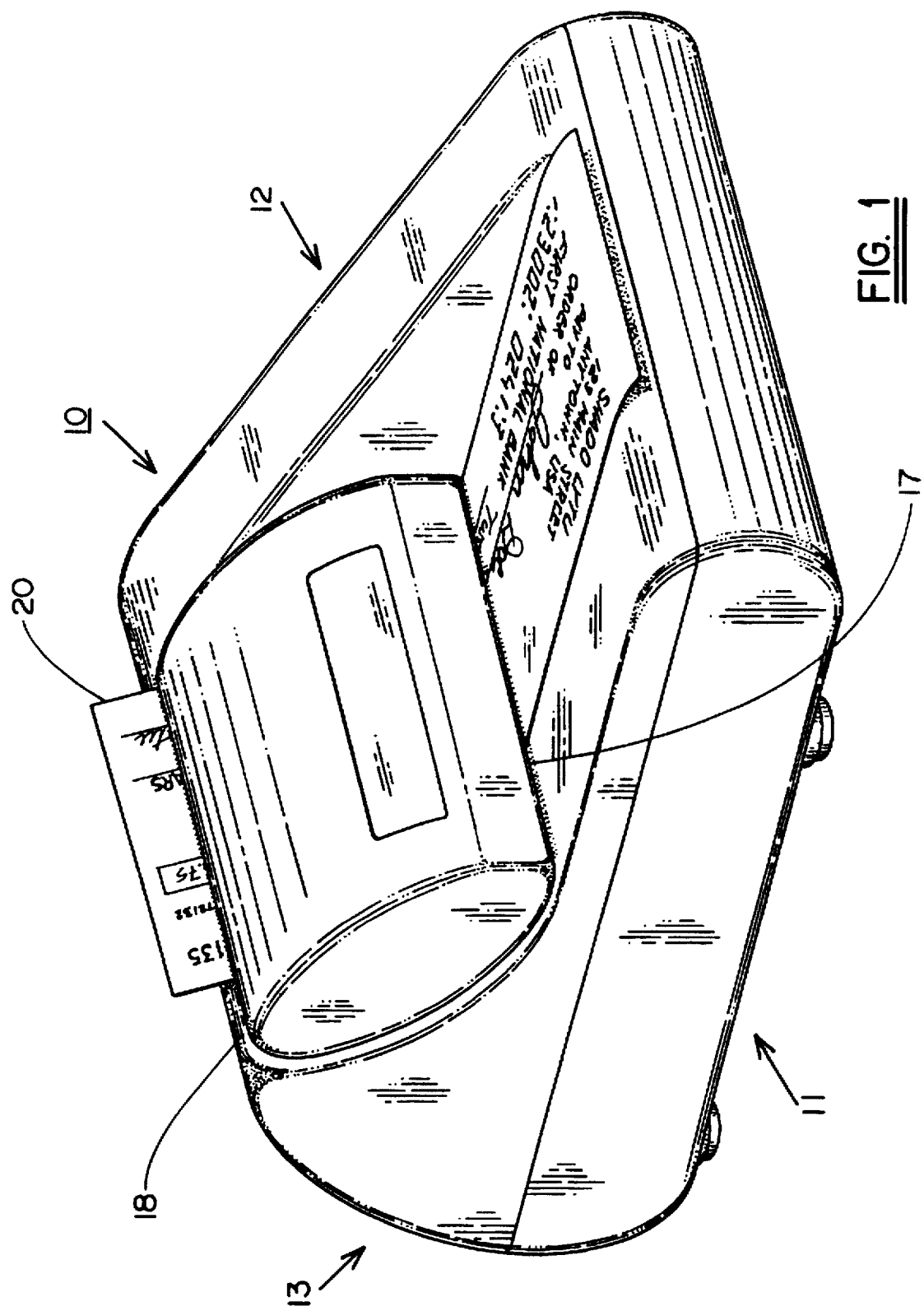
FIG. 1 is a perspective view of a magnetic reader embodying the teachings of the present invention.

Referring to FIG. 1, there is shown a magnetic reader, generally referenced 10, that includes a base 11 and a pair of covers 12 and 13 that are connected to the base by suitable connectors to form an enclosed housing. The housing further includes an entry slot 17 and an exit slot 18 which, as will be explained in greater detail below, are connected internally by suitable guide means describing a path of travel along which an article bearing magnetizable character is directed. A check 20 bearing a series of magnetizable characters is shown being transported through the housing.

Figure 2:
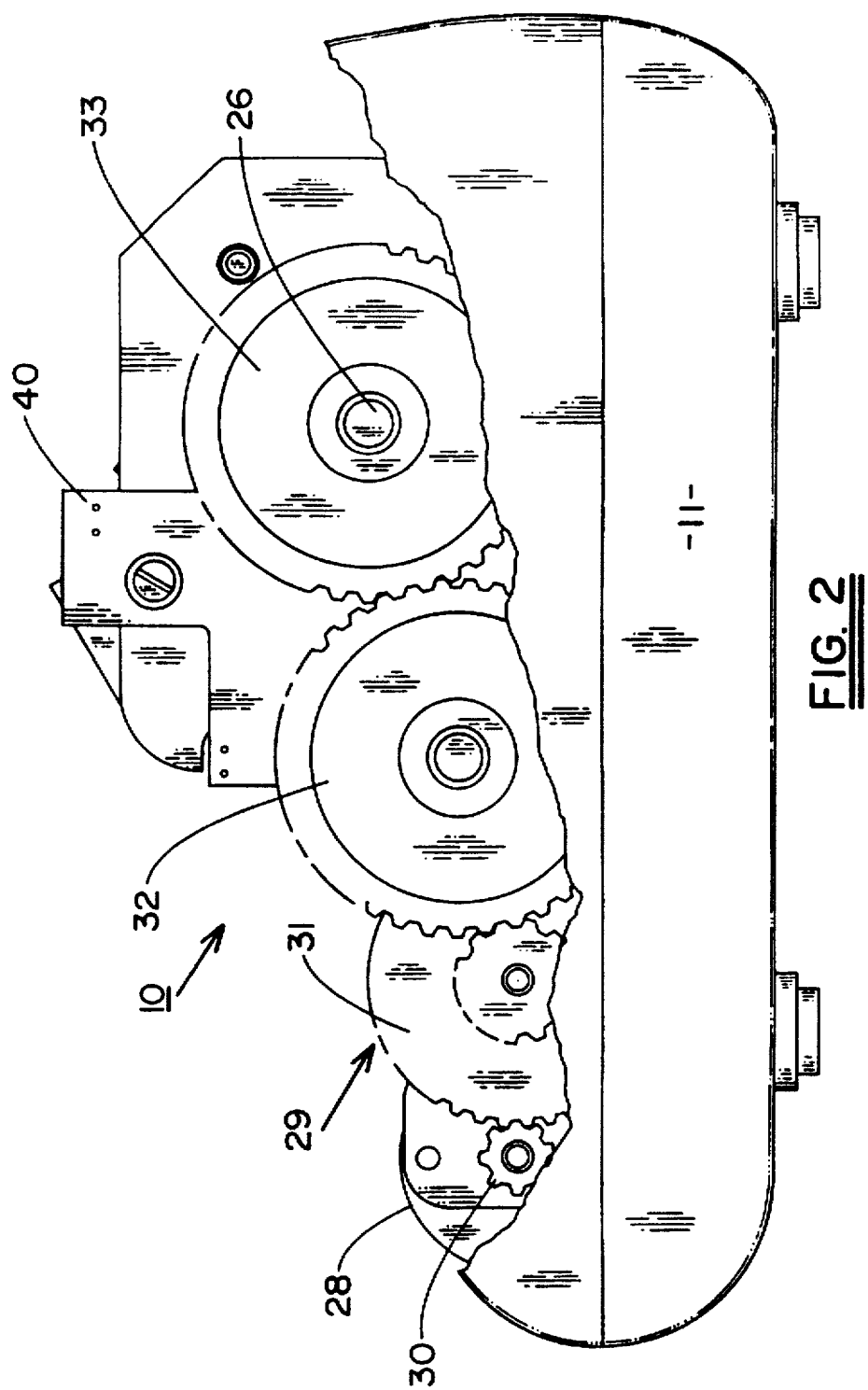
FIG. 2 is a left side elevation showing the drive system employed in the present invention.
Figure 3:
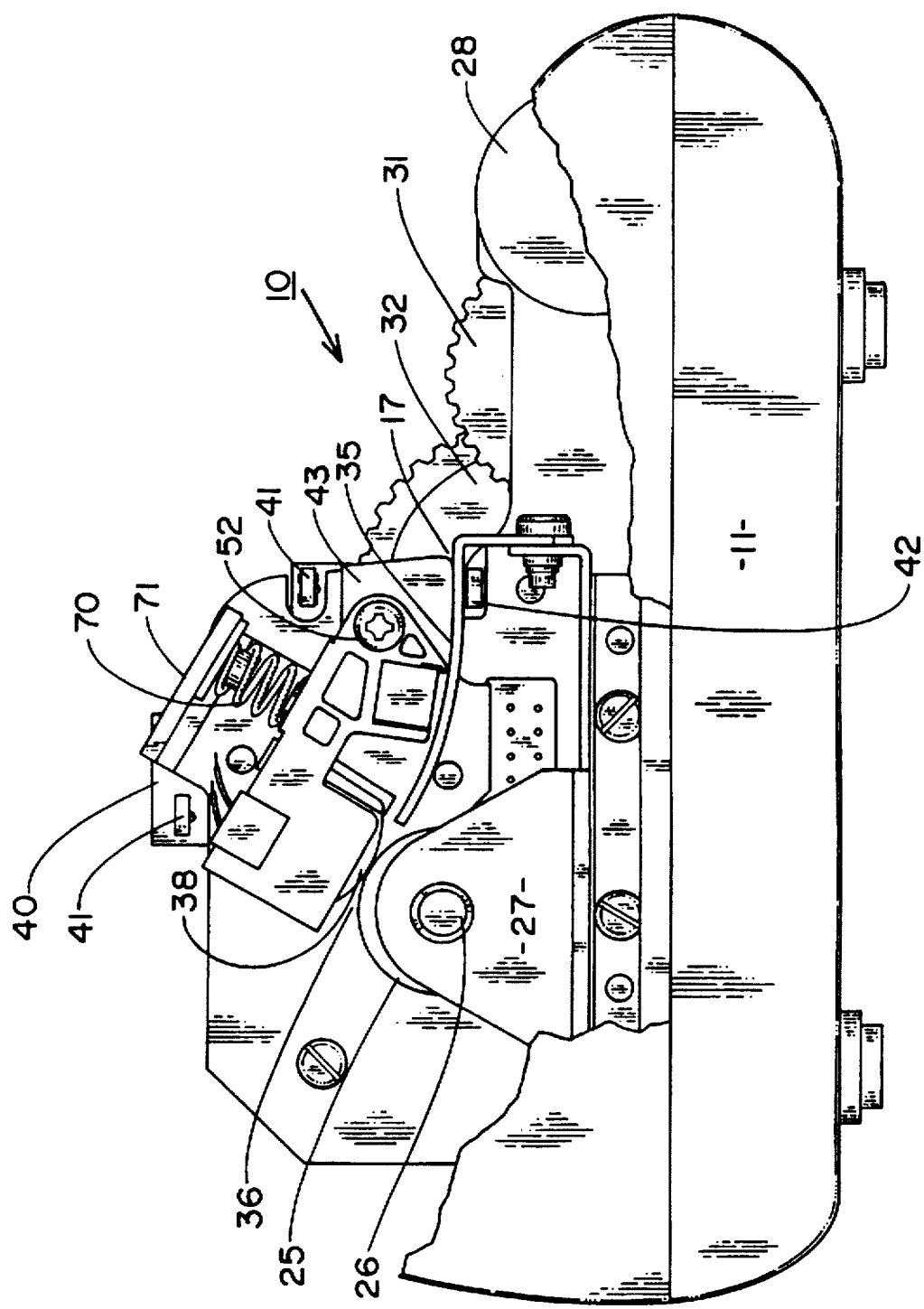
FIG. 3 is an enlarged right side elevation showing a mounting bracket for supporting a read head and a magnet within the housing of the present magnetic reader.

Referring now more specifically to FIGS. 2 and 3, there is shown the base 11 of the housing with the covers broken away to more clearly display the internal components of the reader. A drive roller 25 (FIG. 3) is rotatably supported upon a shaft 26 which is, in turn, journaled for rotation in bearing blocks, one of which is shown at 27 in FIG. 3. The drive roller is coupled to an electric motor 28 by means of a gear train 29. The gear train contains a drive pinion 30 pined to the motor shaft which meshes with a compound gear 31 for reducing the motor speed. The compound gear is coupled to the drive roller by means of idler gear 32 and driver gear 33 that is locked to the drive roller shaft 26. Once the motor is energized, the drive roller will be driven at a predetermined speed through the gear train.

An arcuate shaped plate 35 (FIG. 3) is mounted within the housing by a suitable support mechanism. The plate extends from the entry slot 17 to the nip 36 formed between the outer periphery of the drive roller and bottom surface of a magnetic read head 38. The plate serves as a guide for an article, such as a check 20, that is inserted into the housing through the entry slot to direct the leading edge of the article into the nip of the drive roll.

A circuit board 40 is mounted along the back side of the guide plate which contains photodetectors 41 and 42 for sensing both the leading edge and one side margin of an article as it is moved into the drive roller nip. If it is determined that the leading edge of the article has entered the nip parallel with the axis of the roller and the side margin of the article is parallel with side wall 43, the motor is energized and the article is permitted to pass through the nip and is driven by the drive roller along the intended path of travel. If it is determined that the article is misaligned or skewed as it enters the nip, the motor will not be activated, preventing the article from passing through the nip and thus protecting the article from damage.

Turning now to FIGS. 4 and 5, there is shown a bracket 50 that supports both the read head 38 and magnetic 51 within the housing. The bracket is molded from a single piece of plastic. The bracket is pivotally supported at its back section upon a pivot pin 52. The pivot pin passes through a hole 47 formed in the bracket and is secured in vertical wall 43 of the housing (FIG. 3). The read head 38 is mounted within a rectangular shaped well 49 located in the front section of the bracket. One end wall 54 of the well is molded so that it cants inwardly slightly toward the opposite end wall 55. Each end wall further contains an inwardly turned rib 56 that is arranged to engage the bottom surface of the read head to prevent the head from passing through the well. In assembly, the canted end wall 54 applies a biasing force against the head to force the head into holding contact against the opposing end wall 55.

Each of the opposing side walls 57 and 58 of the well are provided with a vertically disposed tab 59–60 at the top section of the wall. Each tab is canted inwardly and is provided with an inwardly turned rib 61 along its top margin. The tabs are arranged to snap over the top of the read head in assembly to further lock the head in place with the well to prevent the head from moving therein.

The magnet 51 is also mounted in the bracket within a rectangular shaped slotted opening 62 formed in the bottom wall of the bracket. The slotted opening contains a pair of side walls 63 and 64. Wall 63 is canted inwardly to force the magnet into holding contact against the opposite side wall 64. Side wall 64 contains an inwardly disposed rib 65 that is arranged to contact the bottom surface of the magnet in assembly to help hold the magnet within the slotted opening.

A raised boss 67 is cast into the top wall of the bracket about midway along the length of the bracket. As best seen in FIG. 3, a helical wound spring 70 is seated upon the top wall of the bracket over the boss. The top surface of the spring is held in contact against an L-shaped member 71 so that the spring biases the bracket downwardly about the pivot pin 52. This, in turn, urges the bottom recording surface 37 of the read head against the periphery of the drive roller 25 with a predetermined force. Sufficient force is applied to the bracket so that an article that is passed into the nip between the roller and the read head will be driven forward by the roller along the prescribed path of travel between the entrance slot and the exit slot.

Prior to entering the nip, the article must pass directly beneath the magnet, which is supported in the bracket immediately adjacent to the intended path of travel of the article. Accordingly, the magnetizable characters contained on the article are fully magnetized immediately prior to their passing beneath the read head 38.

A metal foil 74 is placed over the raised boss carried on the top wall of the bracket and is passed downwardly along the end wall 54 of the read head well 49 so that the foil is held in pressure contact against the head in assembly. This provides a path to ground via the spring and the L-shaped member to insure that the read head is well grounded when mounted in the bracket.

Figure 6:
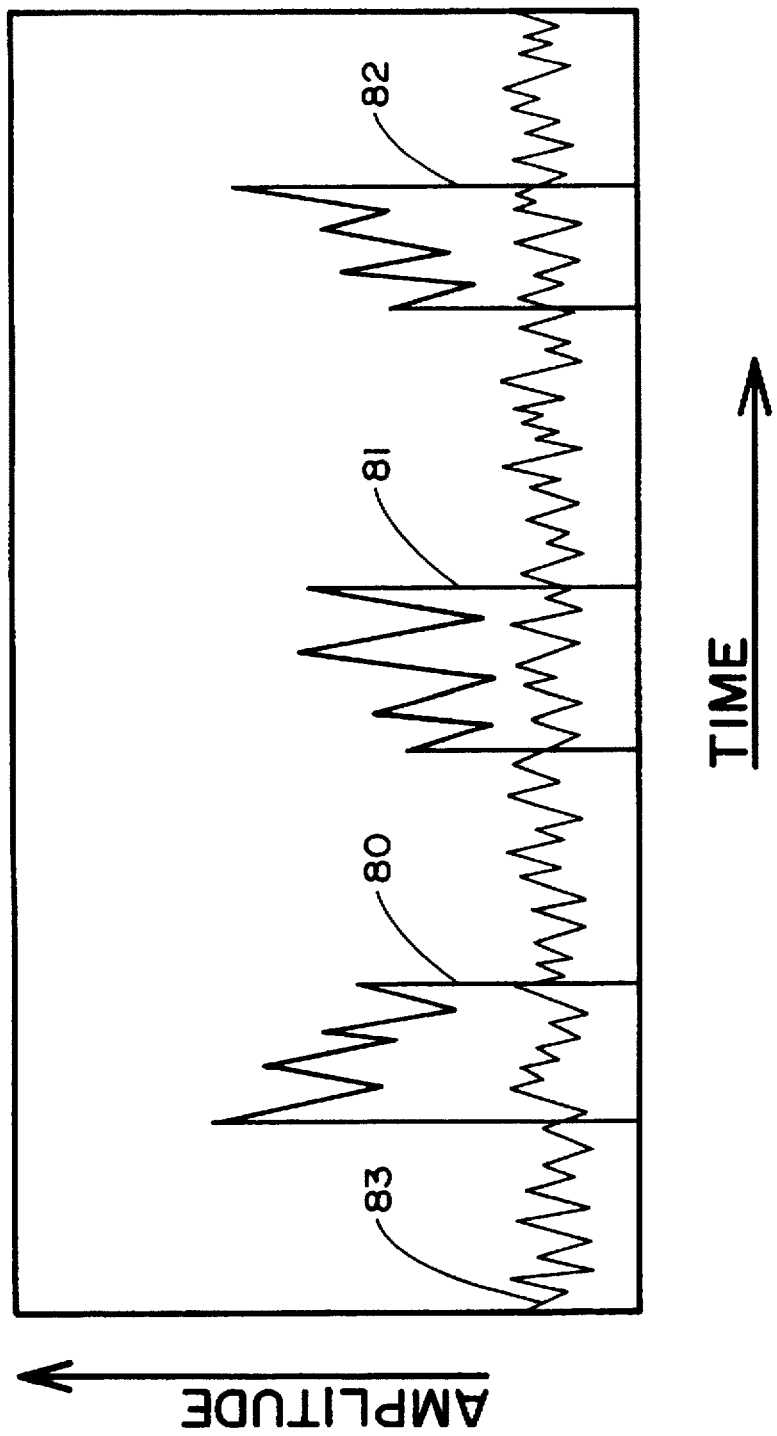
FIG. 6 is a diagram showing typical output of a magnetic read head and unwanted background noise produced by a prior art reader.

As should be evident from the description above, both the read head and the magnet are contained in the same support bracket and are arranged to move uniformly as the bracket swings about the pivot pin. Accordingly, no relative motion is produced between the read head and the magnet which could generate unwanted high output noise that could adversely effect the apparatus' ability to efficiently read characters. FIG. 6 depicts the effect this type of noise has on the output of a prior art magnetic reader in which the magnet and the read head are separately mounted within the reader housing. The diagram shown in FIG. 6 illustrates a series of readout signals 80, 81 and 82, each of which contain the magnetic signature of a particular character that has passed under the read head of the device. Because the magnet and the read head are individually mounted within the housing, they can move randomly. This random movement causes the noise generated by each element to be additive whereby the total amount of noise 83 is relatively high. Tests have shown that the level of noise generated by the apparatus of the present invention is dramatically reduced when the magnet and the read head are both contained in a single support bracket that is pivotally mounted adjacent the path of travel of an article being processed. Accordingly, the efficiency of the reader is greatly enhanced.

While this invention has been explained with reference to the structure disclosed herein, it is not confined to the details set forth and this invention is intended to cover any modifications and changes as may come within the scope of the following claims:

What is claimed is:

1. A magnetic reader that includes
   a housing
   a rotatable drive roller for engaging an article bearing magnetizable characters and advancing said article along a prescribed path of travel,
   drive means for rotating said drive roller,
   a bracket means pivotally supported in said housing adjacent to said path of travel,
   said bracket supporting a magnetic read head in juxtaposition to said drive roller and a magnet upstream from said read head in relation to said path of travel for magnetizing characters on an article moving along said path of travel, and
   biasing means acting against said bracket for urging the read head into contact with said drive roller whereby an article is passed between the read head and the drive roller is moved along the path of travel beneath the magnet and said read head.

2. The reader of claim 1 wherein said bracket is molded from a single piece of plastic.

3. The reader of claim 2 having a well passing through said bracket for containing the magnetic reader therein, at least one wall of said well being resiliently supported in said bracket to force said read head into holding contact against an opposing wall of said well.

4. The reader of claim 3 wherein the walls of said well have first tab means for engaging top and bottom surfaces on said read head.

5. The reader of claim 3 that further includes a conductive shield extending along one wall of the well for grounding the read head to prevent static build up.

6. The reader of claim 3 wherein said bracket further includes a slotted opening in which said magnet is supported.

7. The reader of claim 6 wherein said slotted opening contains a top wall and two opposed side walls, one sidewall being resiliently supported in said bracket for forcing the magnet into holding contact against the opposite side wall.

8. The reader of claim 4 wherein one of said sidewalls further includes second tab means for engaging the bottom surface of said magnet.

9. The reader of claim 1 wherein said biasing means is spring mounted in said housing that acts between the housing and the bracket to rotate the bracket toward the drive roller and urge the read head against the drive roller under a predetermined force.

10. The reader of claim 1 that further includes sensing means for detecting the position of an article along said path of travel, and switch means for energizing the drive means when the article is in a predetermined position along said path of travel.

11. The reader of claim 10 wherein said drive means is an electric motor that is coupled to the drive roller through a gear train.

* * * * *